March 25, 1924.
E. STOAKES
VALVE SPRING RETAINER
Filed Dec. 22, 1921
1,488,365
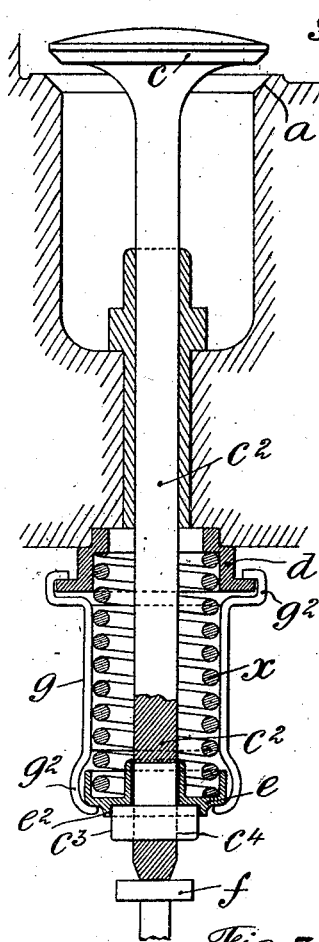
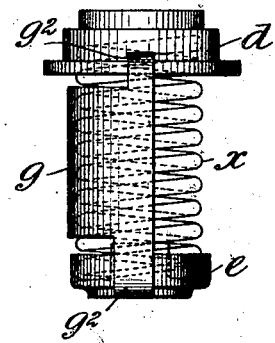
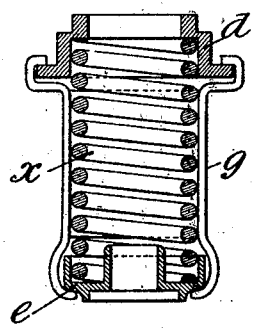
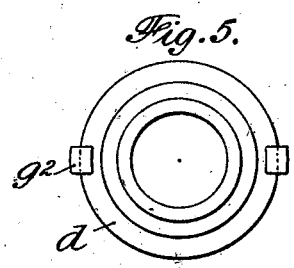
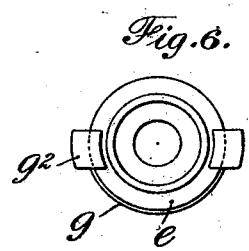
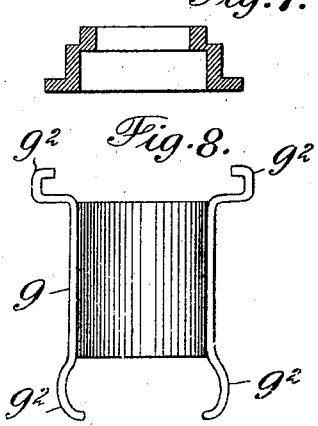
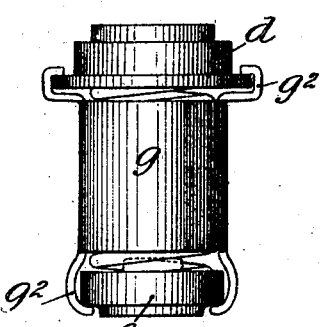
Inventor
Ernest Stoakes Patented Mar. 25, 1924.

1,488,365

UNITED STATES PATENT OFFICE.

ERNEST STOAKES, OF BIRMINGHAM, ENGLAND.

VALVE-SPRING RETAINER.

Application filed December 22, 1921. Serial No. 524,246.

*To all whom it may concern:*

Be it known that I, ERNEST STOAKES, subject of the King of Great Britain, residing at 206 Soho Road, Handsworth, Birmingham, England, draper, have invented certain new and useful Improvements in Valve-Spring Retainers, of which the following is a specification.

The invention provides the hereinafter described and claimed improved appliance for use for easily, conveniently and quickly disassembling and assembling a mushroom valve having a coiled spring; for example, a valve commonly used in an internal combustion engine.

Said appliance is adapted to be hand applied to, or put onto, the coiled spring while the valve members are assembled, and the tappet lifted lifting the valve, to hold said spring in such compressed condition, and is distinctive in its construction and application by it and said spring being removable from the valve members as a one piece part when said members are disassembled; that is to say, in taking down the valve for grinding, for repair, for replacement of any of the members or for any other purpose, the appliance and the spring, held in compressed condition by the appliance, come away as a one piece part ready for easy replacement.

Said appliance may take various forms consistent with the distinguishing feature aforesaid, for example, it may be a cage or enclosing member formed of two parts similar to half tubes having end projections, ribs or flanges and applied to the spring while the later is in compressed condition to contain said spring, support same axially against distortion, and at the same time hold it in compressed condition so that the spring and the appliance can be handled and entirely removed as a one-piece unit. Preferably said appliance is in the form of a half cage rigidly constructed and having end projections, ribs or flanges, to engage the spring.

A further form of appliance constructs the cage of a number of parts having the end projections, ribs or flanges and operative aforesaid, but also arranged so that the length of the cage may be adjusted either before the cage is applied to the spring or subsequently thereto, the latter for the purpose of putting the spring into further compression than what is accomplished by the action of the tappet lifting valve.

A mushroom valve always has a removable spring abutment for the outer end of the spring, and the invention uses this abutment for the one end of the cage to engage, so that said outer abutment comes away with the cage and the spring to be handled as a one-piece unit, but the invention in its desirable form also uses a second or inner abutment washer or piece for the spring to be engaged by the other end of the cage and to be removable with said cage, so that in this form the two abutment washers or pieces, the cage and the spring, are removed as a one-piece unit ready for putting into position again.

The invention in its desirable forms is represented by the accompanying drawings.

Fig. 1 shows a vertical section applied to a valve while the later is lifted by the tappet, this form using two abutment washers for the ends of the spring.

Fig. 2 shows the one-piece unit comprising spring, cage and abutment washers removed from the valve members.

Fig. 3 is a side elevation of Fig. 2.

Fig. 4 is looking at the left-hand side an elevation of Fig. 3.

Fig. 5 is a top-side plan of Fig. 2.

Fig. 6 is an underside plan of Fig. 2.

Fig. 7 shows the inner abutment washer separate.

Fig. 8 shows the cage separate.

With reference to Figs. 1 to 8 the valve plug, the valve seating and the parts applying and fitting the one to the other are of the usual form. The seating is at $a$ and the head and stem of the plug are respectively lettered $c$ and $c^2$. The coiled spring $x$ surrounding the stem $c^2$ operates in compression between inner and outer abutment washers $d$ and $e$. The inner abutment washer $d$ is additional to normal practice and is part of the appliance according to the invention, but the outer abutment washer $e$ is substantially normal practice although its shape may be conveniently changed for the purpose of the invention. The key $c^3$ forming the end abutment of the stem for the washer $e$ is applied to a slot $c^4$ of said stem and engages the recess $e^2$ in the face of the washer $e$ in the usual manner.

$f$ indicates the tappet by which the valve plug is lifted, such being the position shown in Fig. 1.

$g$ is the cage shown separately in Fig. 8. Same is provided by a half tube length having end projections $g^2$ of somewhat hook formation suitable for engagement of the washers $d$ and $e$. Said cage may be of any convenient construction giving rigidity and a one-piece part for handling, but preferably it is a little more than a half circle shown by Fig. 3 so as to enclose more than half of the spring, and its projections are arranged so that when the cage is put onto the spring they engage the washers at the centre, or just over the centre, of the spring's action or axis, so that the spring is held from distortion.

While the valve members are assembled and the tappet lifted lifting the valve plug and further compressing the spring, the cage $g$ is put onto the spring so that its hook projections $g^2$ engage the abutment washers $d$ and $e$ in the manner substantially shown, after which the tappet $f$ is lowered to permit of the key $c^3$ being removed and the valve plug withdrawn. This enables the cage $g$, abutment washers $d$ and $e$ and spring $x$ to be handled and removed as a one-piece unit within which the coiled spring is held in compressed condition as represented by Figs. 3 to 6. Said unit is therefore always ready for reassembling the valve members, the cage $g$ being removed when the members of the valve are in the same positions as they were when the cage was put on.

It will be clearly understood that if the normal lift of the tappet is not sufficient to put the spring $x$ into sufficient compression to suit the length of the cage, an intervening piece may be forced between the end of the tappet and the end of the stem to give a further lift to the valve plug, or the cage $g$ may be built so that its length may be shortened after it has been put into engagement with the washers to further compress the spring and shorten the length of the unit.

Having now described my invention what I claim and desire to secure by Letters Patent is:—

1. A device for mounting and dismounting on a valve stem a spring having washers at its ends, comprising a tubular cage having hooked members projecting beyond the ends of the tubular portion and adapted to fit over said washers, said tubular member being cut away longitudinally to form an opening throughout its length.

2. In a device for mounting and dismounting on a valve stem a spring having washers at both ends, comprising a cage, members projecting from diametrically opposite portions and beyond ends of the cage said members being adapted to fit over said washers, said cage, being cut away longitudinally to form an opening throughout its length.

3. A device adapted for mounting a helical spring on a valve stem, a valve stem comprising a tubular cage having openings on one side and at its ends, and members extending from the end of said cage adjacent the side opening and adapted to hook over said washers.

4. An appliance for the purpose described comprising washers adapted to be mounted on a valve stem constituting removable abutments for the ends of a coil spring and a cage formed with an abutment at each end for engagement with the respective washers by a sidewise movement and operative to hold both washers together with the springs safely compressed between them whereby the spring may be held compressed and may be removed from its valve stem together with said parts as a unit.

In testimony whereof I have hereunto set my hand in presence of two subscribing witnesses.

ERNEST STOAKES.

Witnesses:
JOHN P. FUERY,
D. LEAKER.